United States Patent Office 3,089,833
Patented May 14, 1963

3,089,833
PREPARATION OF HIGHLY FLUORINATED ALKYL CHLORIDES BY IRRADIATION WITH ULTRAVIOLET LIGHT OF FLUOROACYL CHLORIDES ALONE OR ADMIXED WITH FLUOROOLEFINS
John F. Harris, Jr., Wilmington, Del., assignor to E. I. du Pont de Nemours and Company, Wilmington, Del., a corporation of Delaware
No Drawing. Filed Aug. 31, 1959, Ser. No. 836,871
9 Claims. (Cl. 204—158)

This invention relates to, and has as its principal object provision of, a process for preparing highly fluorinated carbon compounds which contain chlorine.

Highly fluorinated carbon compounds which contain minor amounts of chlorine and optionally, hydrogen, possess physical and chemical properties which make the compounds useful in a variety of applications. The compounds can, for example, be employed as heat transfer agents, lubricants, dielectrics, and intermediates for chemical synthesis.

Polyfluorinated compounds containing chlorine have generally been prepared heretofore by direct chlorination of highly fluorinated carbon compounds. The products obtained have usually been mixtures which are difficult to separate into pure components and yields of preferred compounds are frequently low. Highly fluorinated carbon compounds having chlorine and fluorine bonded to the same carbon have been particularly difficult to prepare.

In the present invention, chlorine-bearing highly fluorinated organic compounds are obtained by irradiating with ultraviolet light a polyfluorinated carbacyl chloride which is aliphatic in character (i.e., non-benzenoid) and which has at most one hydrogen and that on a terminal carbon, and which otherwise is perhalogenated, the halogens being selected from fluorine and chlorine, each carbon other than the carbonyl carbon bearing at most one chlorine and at least one fluorine. The halogens in the polyfluorinated carbacyl chloride are predominantly fluorine, the ratio of fluorine to chlorine, exclusive of the acyl chloride group, being at least 2 to 1.

A preferred group of acyl chlorides for use in the process are polyfluorinated carbacyl chlorides which have at most two carbacyl chloride groups and which are represented by the following formula:

XRCOCl

X is hydrogen, chlorine, fluorine, or a carbacyl chloride group (—COCl), R is a divalent non-benzenoid perhalocarbon in which the halogens are selected from fluorine and chlorine, each carbon bearing at most one chlorine and at least one fluorine. The halogens on R are predominantly fluorine, the ratio of fluorine to chlorine being at least 2:1.

In an especially preferred group of polyfluorinated carbacyl chlorides for use in the process, the group R in the above formula is a divalent non-benzenoid perfluorocarbon group; X is, as defined earlier, hydrogen, chlorine, fluorine, or a carbacyl chloride group.

In an optional mode of operating the process, the polyfluorinated acyl chloride, as defined in the above paragraphs, can be irradiated in admixture with a polyhalogenated olefin having at most one hydrogen, the olefin being otherwise perhalogenated, the halogens being selected from fluorine and chlorine, each carbon of the olefin bearing at most one chlorine and at least one fluorine. The optional mode of operation forms a part of this invention and this mode is described more fully in later paragraphs.

The mechanism of the reaction in which the acyl chloride is the sole reactant has not been firmly established but it appears that the principal reaction is the loss of a carbonyl group, i.e., a C=O group, and the bonding of the chlorine radical with the remaining polyfluorinated radical. The principal reaction may, therefore, be illustrated by the following equation, although it is understood that the actual mechanism may be more complicated than that shown by the equation:

XRCOCl→YRCl+CO

The amount of CO released will be determined by the number of acyl chloride groups that are present in the original reactant. X and R are defined as in the previous paragraphs and Y is hydrogen, chlorine, or fluorine. It is apparent from this equation that the divalent polyfluorinated group, R, is carried through the process unchanged and that the structure of the group R is not a critical feature of the invention. R can be open chain or closed chain. It can be straight or branched, saturated or unsaturated. The most readily available acyl chlorides have saturated open chain structures and this group forms a preferred class of reactants. The number of carbon atoms in the group R is not critical but, for reasons of availability, acyl chlorides having up to 18 carbons are preferred.

In the operation of the process employing solely the acylchloride, the principal product of the reaction is a polyfluorinated organic chloride which has the same number of carbon atoms as the divalent polyfluorocarbon group R in the acyl chloride defined above. The process employing solely polyfluoroacyl chlorides is adapted primarily for the preparation of polyfluorinated carbon compounds whose chain length is the same as the chain length of the acyl chloride reactant minus the CO group. The polyfluorinated organic chloride which is obtained has chlorine bonded to the carbon which prior to the reaction was bonded to the acyl chloride group.

To obtain polyfluorinated organic compounds having a greater number of carbon atoms than are present in the acyl chloride reactant, a polyfluorinated acyl chloride of the type defined in previous paragraphs is irradiated in admixture with a polyhalogenated olefin having at most one hydrogen and that on the terminal carbon and otherwise being perhalogenated, the halogens being selected from chlorine and fluorine, each carbon in the olefin bearing at least one fluorine and at most one chlorine. Preferably the ratio of fluorine to chlorine in the olefin is 3:1. Fluoroolefins having internal carbon-carbon double bonds as well as double bonds involving a terminal carbon can be employed. It is preferred for maximum yield of desired products that a fluoroolefin be used which has at least one terminal carbon-carbon double bond.

The preferred fluoroolefins are represented by the following general formula:

R′—CF=CF$_2$

R′ is hydrogen, chlorine, fluorine, or a polyfluorinated hydrocarbon group consisting of carbon, fluorine, and at most one hydrogen or one chlorine, which hydrogen or chlorine, if present, is bonded to a terminal carbon. Fluoroolefins of three more carbons do not telomerize readily under the conditions of the process and fluoroolefins in which R′ in the above formula is a polyfluorinated hydrocarbon group of 1–16 carbons form a preferred group of reactants.

The mechanism of the reaction employing mixtures of polyfluorinated acyl chlorides and polyfluorinated olefins, although not clearly established, is similar to the mechanism which was discussed earlier for the process employing solely the polyfluoroacyl chloride. It appears that carbon monoxide is released, the chlorine radical is bonded to one of the doubly bonded carbons of the fluoroolefin and the polyfluorocarbon radical of the acyl chloride is bonded to other of the doubly bonded carbons of the polyfluoroolefin. The principal reaction product is, therefore, a polyfluorinated organic chloride in which the total number of carbon atoms is equal to the sum of the carbons in the organic radical of the acyl chloride and the carbons in the fluoroolefin.

The acyl chlorides employed in the process are readily prepared by known methods, e.g., by the reaction of polyfluorocarboxylic acids with thionyl chloride or with phosphorus chlorides. The various methods for preparing acyl chlorides are described in Wagner and Zook, "Synthetic Organic Chemistry," chapter 17, pages 546–549, John Wiley & Sons, Inc., New York (1953). The carbon skeleton of the acyl chloride may contain cyclic groups and it may have a branched chain or a straight chain structure. Saturated open chain perfluoro-, ω-hydroperfluoro-, and ω-chloroperfluoroacyl chlorides are preferred for use in the process. Examples of polyfluoroacyl chlorides which may be used in the process are trifluoroacetyl chloride, chlorodifluoroacetyl chloride, difluoroacetyl chloride, 3-H-3-chlorotrifluoropropionyl chloride, 4-H-4-chloropentafluorobutyryl chloride, 5-H-3-chloroheptafluorovaleryl chloride, perfluoro-n-caproyl chloride, 2,2,3,3-tetrafluoropropionyl chloride, ω-chloroperfluorocapryl chloride, ω-hydroperfluorooctadecanoyl chloride, perfluorocyclohexylformyl chloride, perfluorocyclohexylacetyl chloride, and 2-trifluoromethylperfluorobutyryl chloride.

The polyfluorinated olefins are known compounds which are available commercially or are prepared by methods described in the literature. See, for example, Simons, "Fluorine Chemistry," vol. II, page 375, Academic Press, New York (1954). Examples of fluoroolefins which can be used in the process in admixture with a polyfluoroacyl chloride are tetrafluoroethylene, chlorotrifluoroethylene, trifluoroethylene, perfluorobutene-1, perfluoropentene-1, ω-chloroperfluorohexene-1, perfluorononene-3, perfluorododecene-1, 4-chloroperfluorobutene-1, 1,4-dichloroperfluorobutene-1, ω-chloroperfluoropentene-2, 4,6,7-trichloroperfluoroheptene-1, 4,6-dichloroperfluorononene-1, 4,6,8,10,11 - pentachloroperfluorohendecene-1, and the like.

The reaction employing the acyl chloride alone or in admixture with a fluoroolefin is conducted under substantially anhydrous conditions in a reaction vessel which is composed of inert material and which permits the passage of actinic rays. The reaction is conducted in the presence of actinic radiation of the type generally referred to as ultraviolet light. The term "ultraviolet light" is commonly understood to mean light of wave lengths less than 4000 A., the lower limit of wave length being determined in specific cases by the transmission characteristics of the materials through which the light must pass. The lower limit is usually in the range of 1800–2000 A. Although light of any wave length between about 1800 and 4000 A. can be employed in the present process, wave lengths of 2500–3700 A. are preferred since they are readily produced and provide sufficient energy for the desired reaction.

Any source of radiation may be used. Because of improved reaction efficiency sources relatively high in ultraviolet output are preferred. Generally speaking, the mercury vapor arc lamps will be used since they afford a relatively intense source of the preferred ultraviolet light. A wide variety of such lamps are available on the market, including both low and high pressure lamps with various types of glass envelopes. The lamps most desirable for use in the process are those with quartz envelopes since these lamps permit the highest percentage of transmission of ultraviolet light.

It is desirable that the light source be as close as possible to the reactants. This may be accomplished, for example, by placing the lamp immediately adjacent to a transparent wall of the reaction vessel or in a suitable well projecting into the reaction space. A suitable lamp is described in the examples which are given below. This lamp is made of quartz in the form of a helix which fits closely around the reaction vessel.

The temperature and pressure of the reaction mixture during the operation of the process are not critical. The reactants may be employed in the gaseous state although, for reasons of efficiency and conservation of space, it is preferable to conduct the reaction in the liquid phase. In the case of low boiling reactants, it may be necessary to provide a reflux condenser cooled sufficiently, for example as low as −80° C., to prevent loss of reactants and reaction products and to maintain liquid phase conditions. Reactants which are liquids at prevailing atmospheric temperatures can be treated at existing temperatures or at elevated temperatures. A reaction temperature between about −80° and about 200° C. is usually employed. A reaction temperature which lies between about −40° and 150° C. is preferred.

The pressure employed can be atmospheric or it can be above or below atmospheric. For gaseous reactants, the process is generally conducted under sufficient pressure to maintain a liquid phase at the temperature of the reaction. Pressures above or below atmospheric are employed solely as a matter of convenience in the operation of the process. For simplicity of operation, the reaction is preferably carried out at substantially atmospheric pressure or at pressures no greater than about 5 atmospheres.

In certain cases inert diluents may be employed in the process, for example, in reactions wherein low boiling fluoroalkyl chlorides are obtained. The diluents can be high boiling liquids which may reduce the amount of cooling or the amount of pressure which is required to maintain low boiling constituents in the liquid phase. Examples of suitable inert diluents are perfluorocarbons such as perfluorocyclohexane or perfluorokerosene. It is not essential for operability of the process that a diluent be employed.

The reaction is conveniently conducted in a batch process. The reaction can, however, be conducted by a continuous process wherein the reactants are circulated and recirculated through the reaction zone with intermittent removal of the desired chloride and recirculation of the unreacted materials.

Separation of the desired reaction products and their purification is accomplished by conventional methods. Generally the crude reaction products are simply distilled through an efficient fractionating unit at either atmospheric or subatmospheric pressure. Other methods may be employed, such as vapor phase chromatography or passage through molecular sieves.

The examples which follow illustrate the method of conducting the process of the invention. Quantities of reactants and products which are obtained are expressed as parts by weight, unless otherwise stated.

EXAMPLE I

Part A

The reaction unit is a quartz cylinder which has a length about four times the diameter and which is connected to a reflux condenser cooled with a solid carbon dioxideacetone mixture. A low pressure quartz mercury lamp (consuming about 10 watts at 100 volts) is fitted closely in the form of a helix around the quartz cyclinder. The cylinder is charged with 50 parts of perfluorobutyryl chloride and it is then irradiated at atmospheric pressure for 7 days. Refluxing of the reaction mixture occurs. The reaction mixture is distilled through an efficient fractionating column and there is obtained 35.5 parts of perfluoropropyl chloride ($CF_3CF_2CF_2Cl$) boiling at −2.5° C. and 1.97 parts of perfluorohexane ($C_6F_{14}$) boiling at 60° C.

Part B

The reactor is charged with 52 parts of perfluorobutyryl chloride and it is then irradiated for 4 days as described in Part A. Distillation of the reaction mixture yields 27.4 parts of perfluoropropyl chloride, distilling at −4 to −3° C.

EXAMPLE II

The reactor described in Example I is charged with 80 parts of perfluorooctanoyl chloride which is then irradiated at atmospheric pressure and temperature for 6 days. There is obtained by fractional distillation of the reaction mixture 29.9 parts of perfluoro-n-heptyl chloride $$[CF_3(CF_2)_5CF_2Cl]$$

distilling at 134–136° C.

Analysis.—Calc'd. for $C_7F_{15}Cl$: F, 70.5 ; Cl, 8.8. Found: F, 69.6; Cl, 8.7.

Examples I and II above illustrate the invention in its application to polyfluoroacyl chlorides having one acyl chloride group. The invention is generic to perfluoroacyl chlorides, ω-chloroperfluoroacyl chlorides and ω-hydroperfluoroacyl chlorides having at least one acyl chloride group in the compound. Thus, the process of the above examples can be used to obtain dichlorodifluoromethane from chlorodifluoroacetyl chloride, chlorotrifluoromethane from trifluoroacetyl chloride, chloropentafluoroethane from perfluoropropionyl chloride, chloroperfluoroundecane from perfluorododecanoyl chloride, chloroperfluoroheptadecane from perfluorooctadecanoyl chloride, chlorotetrafluoroethane from ω-hydroperfluoropropionyl chloride, 1,3-dichloroperfluoropropane from ω-chloroperfluorobutyryl chloride, 1H-4-chlorooctafluorobutane from ω-hydroperfluorovaleryl chloride, 2-chloroperfluorobutane from 2 trifluoromethylperfluorobutyryl chloride, choloperfluorocyclohexane from perfluorocyclohexaneformyl chloride and chlorodifluoromethyl-perfluorocyclohexane from perfluorocyclohexylacetyl chloride.

EXAMPLE III

The reactor of Example I is charged with 25 parts of perfluoroglutaryl chloride which is irradiated at atmospheric pressure for 6 days with no external heating. Upon fractional distillation of the reaction mixture, there is obtained 6.0 parts of 1,3-dichloroperfluoropropane ($ClCF_2CF_2CF_2Cl$), boiling at 34–36° C., and 2.1 parts of 1,6-dichloroperfluorohexane, boiling at 109–114° C.

Example III above illustrates the invention in its application to perfluoroacyl chlorides having more than one acyl chloride group in the compound. The invention is generic to perfluoroacyl chlorides bearing two or more acyl chloride groups. Thus, the process of Example III can be used to obtain 1,2-dichlorotetrafluoroethane from tetrafluorosuccinyl chloride, 1,4-dichloroperfluorobutane from perfluoroadipyl chloride, and dichlorodifluoromethane from difluoromalonyl chloride.

EXAMPLE IV.

The reactor of Example I is charged with a mixture of 50 parts of perfluorobutyryl chloride and 80 parts of perfluoroheptene-1. The mixture is irradiated at atmospheric pressure and temperature for 5 days. There is obtained by fractional distillation of the reaction mixture (1) 52.9 parts of monochloroperfluorodecane, boiling at 84–92° C./62 mm., and (2) 21.2 parts of a long chain dichloroperfluoroalykane of approximately 14 carbon chain length, boiling at 109–116° C./13 mm.

Analysis.—Calc'd for (1) $C_{10}F_{21}Cl$: F, 72.0; Cl, 6.4. Found: F, 71.7; Cl, 6.4. (2) $C_{14}F_{28}Cl_2$: C, 21. 8; F, 68.9; Cl, 9.2. Found: C, 22.3; F, 69.9; Cl, 8.2.

The above example illustrates the invention as applied to a mixture of a perfluoroacyl chloride and a perfluoroolefin. The process of the invention is generic to such mixtures and it can be used to obtain, for example, chlorononafluorobutane from perfluoropropionyl chloride and tetrafluoroethylene, chloroperfluoropentane from perfluoropropionyl chloride, and hexafluoropropene, chloroperfluoroundecane from perfluorooctanoyl chloride and perfluorobutene, and 2-chloro-4-trifluoromethylperfluorohexane from 2-trifluoromethylperfluorobutyryl chloride and hexafluoropropene.

EXAMPLE V

The reactor of Example I is charged with a mixture of 55 parts of perfluorobutyryl chloride and 40 parts of 4-hydroperfluorobutene-1. The mixture is irradiated at atmospheric pressure and temperature for 6 days. Upon fractional distillation of the reaction mixture there is obtained 22.3 parts of 1-hydro-3-chloroperfluoroheptane, a colorless liquid boiling at 120–124° C. (mostly at 122° C.); $n_D^{23}$, 1.3022. There is also obtained 12.2 parts of a higher molecular weight chlorofluoroalkane, boiling at 184–190° C.; $n_D^{23}$, 1.3400, whose analysis indicates the compound to be 1,3-dichloroperfluoroheptane.

Analysis.—Calc'd. for $C_7HF_{14}Cl$: C, 21.8; H, 0.3; F, 68.7; Cl, 9.2. Found: C, 22.3; H, 0.4; F, 67.6; Cl, 8.4. Calc'd. for $C_7HF_{14}Cl_2$: C, 20.0; Cl, 16.8; F, 63.2. Found: C, 22.5; Cl, 14.7; F, 61.4.

The above example illustrates the invention employing a mixture of a perfluoroacyl chloride and an ω-hydroperfluoroolefin. The invention is generic to such mixtures and can be employed to obtain, for example, 1H-2-chloroperfluorooctane from perfluorohexanoyl chloride and 3H-pentafluoropropene, 1H-4-chloroperfluoroheptane from pentafluoropropionyl chloride and 5H-nonafluoropentene-1 and 1H,11H-3,9-dichloroperfluoroundecane from perfluoroglutaryl dichloride and 4H-perfluorobutene.

EXAMPLE VI

The reactor of Example I is charged with a mixture of 50 parts of ω-hydroperfluorovaleryl chloride and 35 parts of 4-hydroperfluorobutene-1. The mixture is irradiated at atmospheric temperature and pressure for 6 days. Upon fractional distillation of the reaction mixture there is obtained 14.3 parts of 1H,8H-3-chloroperfluorooctane, boiling at 158–162° C. There is also obtained a considerable quantity of higher boiling liquid which is a mixture of higher molecular weight fluorochloroalkanes.

Analysis.—Calc'd. for $C_8H_2ClF_{15}$: C, 22.9; H, 0.5; Cl, 8.5; F, 68.0. Found: C, 23.6; H, 1.0; Cl, 8.5; F, 68.0.

The above example illustrates the invention as applied to a mixture of ω-hydro-substituted perfluoroacyl chlorides and ω-hydro-substituted perfluoroolefins. The invention is generic to such mixtures and it can be employed to prepare, for example, 1H,5H-2-chloroperfluoropentane from 3H-tetrafluoropropionyl chloride and 3H-pentafluoropropene, 1H,8H-4-chloroperfluorooctane from 4H-hexafluorobutyryl chloride and 5H-perfluoropentene-1, and 1H,11H-3-chloroperfluoroundecane from 8H-perfluorooctanoyl chloride and 4H-perfluorobutene-1.

The process of the invention as illustrated in the above examples can be used to prepare 1,2,6-trichloroperfluorohexane from 4-chloroperfluorobutyryl chloride and 3-chloropentafluoropropene, and 1,4,7-trichloroperfluoroheptane from 3-chlorotetrafluoropropionyl chloride and 5-chloroperfluoropentene.

The products obtained by the process of this invention are generally chemically stable materials. Low boiling products are useful as propellants in aerosols and the higher boiling products, because of thermal stability and resistance to oxidation, are useful in the field of lubricants and stable liquids. Many of the products obtainable by the process are well known and useful chemicals.

Since obvious modifications and equivalents in the invention will be evident to those skilled in the chemical art, I propose to be bound solely by the appended claims.

The embodiments of the invention in which an exclusive property or privilege is claimed are defined as follows:

1. The process of forming a chlorofluorocarbon which comprises irradiating with ultraviolet light a polyfluorinated carbacyl chloride which is aliphatic in character and which has at most one hydrogen and that on a terminal carbon, and which otherwise is perhalogenated, the halogens being selected from the group consisting of fluorine and chlorine, each carbon other than the carbonyl carbon bearing at most one chlorine and at least one fluorine.

2. The process of forming a chlorofluorocarbon which comprises irradiating with ultraviolet light a compound of the formula XRCOCl wherein (1) R is a divalent non-benzenoid perhalocarbon in which the halogens are selected from the class consisting of fluorine and chlorine, each carbon bearing at most one chlorine and at least one fluorine, and (2) X is chosen from the class consisting of hydrogen, chlorine, fluorine and carbacyl chloride.

3. The process of claim 2 wherein the compound XRCOCl is irradiated in admixture with a polyhalogenated olefin having at most one hydrogen and that on the terminal carbon and being otherwise perhalogenated, the halogens being selected from the class consisting of chlorine and fluorine, each carbon in the olefin bearing at least one fluorine and at most one chlorine.

4. The process of forming perfluoropropyl chloride which comprises irradiating perfluorobutyryl chloride with ultraviolet light.

5. The process of forming perfluoro-n-heptyl chloride which comprises irradiating perfluorooctanoyl chloride with ultraviolet light.

6. The process of forming 1,3-dichloroperfluoropropane which comprises irradiating perfluoroglutaryl chloride with ultraviolet light.

7. The process of forming a chlorofluorocarbon which comprises irradiating perfluorobutyryl chloride in admixture with a perfluoroolefin with ultraviolet light.

8. The process of claim 7 wherein the perfluoroolefin is perfluoroheptene-1.

9. The process of forming a chlorofluorocarbon which comprises irradiating perfluorobutyryl chloride in admixture with an ω-hydroperfluoroolefin with ultraviolet light.

References Cited in the file of this patent

UNITED STATES PATENTS 2,967,810    Harris _____ Jan. 10, 1961

OTHER REFERENCES

Ellis et al.: Chemical Action of Ultraviolet Rays, 1941, page 440.

Proceedings of Chemical Society (London), May 1957, page 146.